US012248386B2

(12) United States Patent
Cosentino et al.

(10) Patent No.: US 12,248,386 B2
(45) Date of Patent: Mar. 11, 2025

(54) APPLICATION PROFILING TO RESIZE AND RECONFIGURE COMPUTE INSTANCES

(71) Applicant: Red Hat, Inc., Raleigh, NC (US)

(72) Inventors: Andrea Cosentino, Milan (IT); Paolo Antinori, Milan (IT)

(73) Assignee: Red Hat, Inc., Raleigh, NC (US)

( * ) Notice: Subject to any disclaimer, the term of this patent is extended or adjusted under 35 U.S.C. 154(b) by 541 days.

(21) Appl. No.: 17/505,862

(22) Filed: Oct. 20, 2021

(65) Prior Publication Data

US 2023/0119536 A1    Apr. 20, 2023

(51) Int. Cl.
*G06F 11/34* (2006.01)
*G06F 9/50* (2006.01)
*G06F 11/30* (2006.01)

(52) U.S. Cl.
CPC .......... *G06F 11/3409* (2013.01); *G06F 9/505* (2013.01); *G06F 11/302* (2013.01); *G06F 11/3433* (2013.01)

(58) Field of Classification Search
CPC .... G06F 11/3409; G06F 9/505; G06F 11/302; G06F 11/3433
See application file for complete search history.

(56) References Cited

U.S. PATENT DOCUMENTS

| 9,916,135 | B2 | 3/2018 | Dube et al. | |
| 11,138,049 | B1* | 10/2021 | Featonby | G06F 11/3447 |
| 11,669,263 | B1* | 6/2023 | Ramesh | G06F 3/0679 |
| | | | | 711/154 |
| 11,886,926 | B1* | 1/2024 | Gadalin | G06F 9/4856 |
| 2010/0269109 | A1* | 10/2010 | Cartales | G06F 9/45558 |
| | | | | 718/1 |
| 2012/0089980 | A1* | 4/2012 | Sharp | G06F 9/45558 |
| | | | | 718/1 |
| 2013/0188483 | A1* | 7/2013 | Teepell | H04L 43/0876 |
| | | | | 370/235 |
| 2014/0304404 | A1 | 10/2014 | Marr et al. | |

(Continued)

OTHER PUBLICATIONS

Brendan Gregg, "BPF Performance Tools," Pearson Education (Year: 2020).*

(Continued)

*Primary Examiner* — Benjamin C Wu
(74) *Attorney, Agent, or Firm* — Kilpatrick Townsend & Stockton LLP

(57) ABSTRACT

Systems and techniques for application profiling to resize and reconfigure compute instances are generally described. In some examples, a first application executing in a user space of a first compute instance may be determined. A Berkeley Packet Filter (BPF) process may be executed in the user space of the first compute instance. The BPF process monitors resource consumption of a first resource of the first compute instance. First consumption data for the first resource may be determined. The first consumption data may be associated with a first process of the first application over a first period of time. The first consumption data may be evaluated using first criteria. A configuration of a second compute instance may be determined based on evaluation of the first consumption data using the first criteria. The second compute instance may be deployed according to the configuration.

20 Claims, 5 Drawing Sheets

(56) References Cited

U.S. PATENT DOCUMENTS

| | | | | |
|---|---|---|---|---|
| 2016/0154670 | A1* | 6/2016 | Alessio | G06F 9/5077 718/1 |
| 2017/0222944 | A1* | 8/2017 | Shantha | G06F 9/5072 |
| 2017/0230266 | A1* | 8/2017 | Smola | H04L 43/0876 |
| 2018/0032362 | A1* | 2/2018 | Buil | H04L 67/10 |
| 2018/0123939 | A1* | 5/2018 | Raman | H04L 41/5016 |
| 2018/0196648 | A1* | 7/2018 | Henderson | G06F 11/34 |
| 2018/0285166 | A1* | 10/2018 | Roy | H04L 41/0895 |
| 2018/0287902 | A1* | 10/2018 | Chitalia | H04L 43/0876 |
| 2018/0365044 | A1* | 12/2018 | Movsisyan | H04L 41/40 |
| 2019/0327185 | A1* | 10/2019 | Hassan | H04L 43/0876 |
| 2020/0177372 | A1* | 6/2020 | Bhamidipati | H04L 9/50 |
| 2021/0058424 | A1* | 2/2021 | Chang | G06F 11/3409 |
| 2021/0312037 | A1* | 10/2021 | Revivo | G06F 21/577 |
| 2021/0366268 | A1* | 11/2021 | Jain | H04L 41/0823 |
| 2022/0121362 | A1* | 4/2022 | Liu | G06F 3/0604 |
| 2022/0147434 | A1* | 5/2022 | Asgar | G06F 11/323 |
| 2022/0147542 | A1* | 5/2022 | Asgar | G06N 20/00 |
| 2022/0215101 | A1* | 7/2022 | Rioux | G06F 21/577 |
| 2022/0269520 | A1* | 8/2022 | Yamamoto | G06F 9/45533 |
| 2022/0398083 | A1* | 12/2022 | Cosentino | G06F 11/3013 |
| 2022/0407625 | A1* | 12/2022 | Radi | H04L 41/147 |
| 2022/0413891 | A1* | 12/2022 | Featonby | G06F 9/5027 |
| 2022/0417257 | A1* | 12/2022 | Behl | H04L 63/1416 |
| 2023/0032686 | A1* | 2/2023 | Williams | G06F 16/9535 |
| 2023/0075355 | A1* | 3/2023 | Twigg | H04L 67/306 |
| 2023/0119536 | A1* | 4/2023 | Cosentino | G06F 11/3433 718/104 |

OTHER PUBLICATIONS

Brendan Gregg, âBPF Performance Tools,â Pearson Education (Year: 2020).*

Karve; Resize, Migrate, Replicate and Evacuate in the Context of Cloud; Jul. 15, 2014; 9 pgs; Retrieved from https://www.ibm.com/blogs/cloud-computing/2014/07/15/resize-migrate-replicate-evacuate-context-cloud/ on Aug. 6, 2021.

Taherizadeh et al.; Dynamic Multi-level Auto-scaling Rules for Containerized Applications; The Computer Journal; May 8, 2018; 24 pgs; vol. 6; No. 22; The British Computer Society.

Levin; ViperProbe: Using eBPF Metrics to Improve Microservice Observability; May 2020; 15 pgs; Brown University Computer Science Honors Thesis.

Álvarez; Automatic Rescaling and Tuning of Big Data Applications on Container-based Virtual Environments; Jul. 2020; 168 pgs; Doctoral Thesis Universidade Da Coruna.

Author Unknown; Right Sizing is an Ongoing Process; 2021; 6 pgs; Retrieved from https://aws.amazon.com/aws-cost-management/aws-cost-optimization/right-sizing/ on Aug. 6, 2021.

Author Unknown; Scaling based on Cloud Monitoring metrics; 15 pgs; Retrieved from https://cloud.google.com/compute/docs/autoscaler/scaling-stackdriver-monitoring-metrics on Aug. 6, 2021.

* cited by examiner

APPLICATION PROFILING TO RESIZE AND RECONFIGURE COMPUTE INSTANCES

BACKGROUND

The present disclosure generally relates to shared computing environments such as cloud environments. Shared computing environments typically employ orchestration of the deployment of guest computing instances that perform the computing tasks in the networked computer systems. In computer systems, it may be advantageous to scale application deployments by using guest compute instances such as virtual machines and containers that may be used for creating hosting environments for running application programs. Compute instances deployed in a cloud-based environment may offer different types of compute resources as a service. For example, various classes of compute instances that are deployed by a cloud service provider may differ in terms of available memory, disk, input/output speed, compute capability (e.g., processor speed), etc.

SUMMARY

The present disclosure provides new and innovative systems and methods for application profiling to resize and/or reconfigure compute instances. In some examples, a method may include determining a first application executing in a user space of a first compute instance. In some cases, the methods may include causing a Berkeley Packet Filter (BPF) process to be executed in the user space of the first compute instance. In various examples, the BPF process may monitor resource consumption of a first resource of the first compute instance. In some cases, the BPF process may be used to determine first consumption data for the first resource, the first consumption data being associated with a first process of the first application over a first period of time. In further examples, the methods may include evaluating the first consumption data using first criteria. The first criteria may include at least one threshold related to resource consumption of the first compute instance. In various other examples, a configuration of a second compute instance may be determined based on evaluation of the first consumption data using the first criteria. In some further examples, the second compute instance may be deployed according to the configuration. In various cases, the first application may be executed in the user space of the second compute instance.

In various other examples, a system may include at least one processor and non-transitory computer-readable memory configured in communication with the at least one processor. The non-transitory computer-readable memory may store instructions that, when executed by the at least one processor, are configured to determine a first application executing in a user space of a first compute instance. In some examples, the instructions may be further configured to cause a Berkeley Packet Filter (BPF) process to be executed in the user space of the first compute instance, wherein the BPF process monitors resource consumption of a first resource of the first compute instance. In various cases, the instructions may be further configured to determine, using the BPF process, first consumption data for the first resource, the first consumption data being associated with a first process of the first application over a first period of time. In some examples, the instructions may be effective to evaluate the first consumption data using a first criteria, the first criteria including at least one threshold related to resource consumption of the first compute instance. In some other examples, the instructions may be effective to determine a configuration of a second compute instance based on evaluation of the first consumption data using the first criteria. In some cases, the instructions may be further effective to cause the second compute instance to be deployed according to the configuration. In various cases, the instructions may be effective to cause the first application to be executed in the user space of the second compute instance.

In yet other examples, a non-transitory machine readable medium may store a program, which when executed by at least one processor causes a container-based cluster of compute nodes to determine a first application executing in a user space of a first compute instance of the container-based cluster of compute nodes. In various examples, the program may cause a Berkeley Packet Filter (BPF) process to be executed in the user space of the first compute instance, wherein the BPF process monitors resource consumption of a first resource of the first compute instance. In various other examples, the program may determine, using the BPF process, first consumption data for the first resource, the first consumption data being associated with a first process of the first application over a first period of time. In some other examples, the program may evaluate the first consumption data using a first criteria, the first criteria including at least one threshold related to resource consumption of the first compute instance. In still other examples, the program may determine a configuration of a second compute instance based on evaluation of the first consumption data using the first criteria. In further examples, the program may cause the second compute instance to be deployed according to the configuration. In various other cases, the program may cause the first application to be executed in the user space of the second compute instance.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
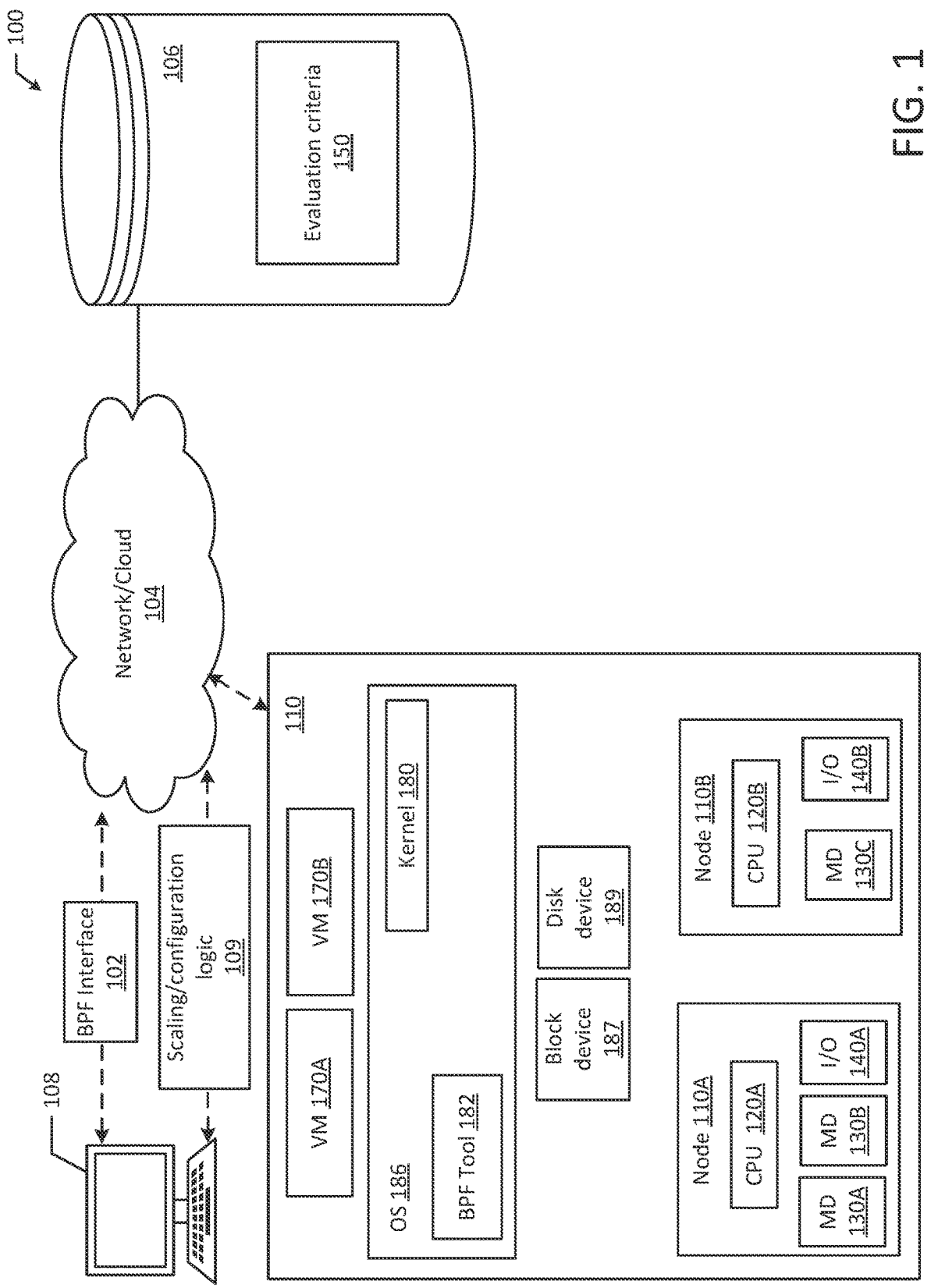
FIG. 1 illustrates a block diagram of an example application profiling system that may be used to resize and/or reconfigure compute instances according to an example embodiment of the present disclosure.

Techniques are disclosed for monitoring application resource consumption for compute instances and rescaling the compute instances (e.g., cloud-based compute instances such as an EC2 instance for Amazon Web Services® or a virtual machine on Azure® by Microsoft®) when the current deployment is non-optimal (e.g., when resource consumption does not satisfy pre-defined criteria). Specifically, the present disclosure describes using Berkeley Packet Filter (BPF) based approaches for monitoring compute resource consumption. Examples of compute resources that may be monitored using the various techniques described herein include central processing unit (CPU) consumption, memory consumption, input/output operations, and/or disk consumption.

Previous cloud compute instance monitoring techniques typically take two approaches. A first, lightweight approach is to deploy a monitoring agent in the kernel space. However, permitting kernel level access and/or modifications may cause instability of the operating system and/or may pose a security risk in terms of the attack surface that may be presented by the monitoring agent/process. As such, many monitoring techniques involve deploying agents in the user space. However, such approaches are often heavy weight as they involve injecting libraries that extract the desired information. This may, in turn, affect the performance and/or resource consumption of the application and/or processes. As such, typical user space monitoring processes do not accurately reflect application resource consumption of a system, since the monitoring processes themselves affect resource consumption.

Accordingly, in the various systems and techniques described herein, BPF tools that monitor resource consumption are executed at the system level, but in the user space. BPF processes are light weight and have minimal impact on performance. BPF is a technology used in computers and operating systems for analyzing network traffic and filtering network traffic. For example, BPF tools may provide an interface to data link layers, permitting raw link-layer packets to be sent and received. BPF also supports filtering packets, allowing processes to supply a filter program that specifies which packets can be received. For example, a "tcpdump" process may prefer to receive only packets that initiate a TCP connection. By utilizing BPF, the BPF technology may advantageously return only packets that pass the filter (e.g., packets that initiate a TCP connection) that the process (e.g., "tcpdump" process) supplies. In doing so, the BPF advantageously avoids copying unwanted packets from the operating system kernel to the process, thereby advantageously improving performance. In some instances, BPF's filtering capabilities may be implemented as an interpreter for a machine language for BPF virtual machines. BPF tools allow programs to fetch data from packets, perform arithmetic operations on the data, and compare any results against constants, predetermined thresholds, or other data in the packet. Additionally, BPF tools allow packets to be accepted or rejected based on the results of any tests or operations performed by the BPF tools.

As noted above, BPF tools may be used to observe operating systems and allows users to run small pieces of code quickly and safely inside the operating system. For example, with BPF technology, developers may write small BPF programs that can monitor data, record data, and determine a system's state (e.g., system in the idle state or system under heavy load). Unlike other software update mechanisms, the BPF tools advantageously may perform updates by running pieces of code safely inside the operating system without writing new kernel modules. For example, as previously described, many traditional resource-monitoring mechanisms write and install new kernel modules, which may cause the operating system (OS) to crash or enter kernel panic. For example, kernel panic is a safety measure taken by an OS's kernel upon detecting an internal fatal error in which the kernel is unable to safely recover from or where continuing to run the system may have higher risks of major data loss.

Some of the network traffic analysis and filtering performed by BPF technology may be to monitor the load (e.g., CPU load) of the compute instance at a process level. For example, the BPF system may monitor various processor resource consumption data (e.g., CPU load, CPU idle time, etc.). In various examples, the CPU profile may be determined using the profile.py tool from BPF and/or the CPU unclaimed BPF tool. In another example, memory consumption (e.g., "memory pressure") of compute instances may be monitored using the memoryleak BPF tool. In another example, the IOStat BPF tool may be used to monitor disk performance of compute instances (e.g., in terms of an amount of memory written per second (or other unit of time)). In another example, one or more BPF tools (e.g., the Biolatency BPF tool) may be used to analyze the latency of input/output (I/O) operations (e.g., by determining I/O usage in terms of memory amount per unit of time). Biolatency may summarize block device I/O latency as a histogram to record the distribution of I/O latency. Various other information may be used to monitor compute resource consumption of I/O. For example, a number of syscalls related to an application, logical ports used by an application, buffer memory levels, etc.

BPF resource monitoring at a process level may be used to determine whether an application deployed on a particular compute instance should be instead deployed on a resized and/or reconfigured compute instance. "Resizing" a compute instance may refer to deploying a new compute instance with different resource capacity (e.g., increased memory) relative to the previous compute resource being monitored. In various examples, when a new, resized compute instance is deployed for an application, the old compute instance may be terminated. "Reconfiguring" a compute instance may refer to modifying the resource allocation of the monitored compute instance. In various examples, an evaluation criteria may define resource consumption thresholds. If the resource consumption thresholds are violated (e.g., BPF monitoring indicates that unclaimed CPU percentage is 40% over a given time period, but the threshold unclaimed CPU percentage is 25%), the triggering event(s) (e.g., data indicating one or more threshold violations) may be passed to an automation tool script (e.g., an Ansible role, Terraform script, etc.) that may be used to programmatically deploy a new compute instance that is optimized for the deployed application and/or process. In the foregoing example, a down-scaled compute instance may be deployed so that the unclaimed CPU percentage is decreased. The application may be executed on the down-scaled compute instance. The particular evaluation criteria to be used and reaction strategy (e.g., reconfiguration, resizing) depend on the desired implementation. However, some examples are provided herein for illustrative purposes. In a simplistic example, if an application executing on a compute instance consistently exceeds a CPU usage target by 15%, a new compute instance may be deployed with 15% additional CPU capacity relative to the previous compute instance in order to optimize the deployment for the application.

FIG. 1 illustrates a block diagram of an example application profiling system 100 that may be used to resize and/or reconfigure compute instances according to an example embodiment of the present disclosure. The system 100 may include a compute instance 110, its corresponding OS 186 and any supporting hardware. For example, the system 100 may include a compute instance 110 with a memory (e.g., MDs 130A-C), a processor (e.g., CPU 120A-B) in communication with the memory (e.g., MDs 130A-C). The operating system (OS) 186 may include a Berekely Packet Filter ("BPF") tool 182. In the illustrated example, the BPF tool 182 is an integrated tool of the OS 186 (e.g., is part of the OS 186). However, in other examples the BPF tool 182 may be separate from the OS 186.

As illustrated in FIG. 1, a developer may use a BPF interface 102 of a device 108 to monitor resource consumption by one or more applications deployed on compute instance 110 using BPF tool 182. The device 108 may communicate over a network/cloud 104 with non-transitory computer-readable memory 106. The non-transitory computer-readable memory 106 may store evaluation criteria 150. Evaluation criteria 150 may store one or more thresholds related to resource consumption of compute instances (e.g., cloud-based compute instances such as containers and/or virtual machines deployed in a cloud environment). An example of evaluation criteria 150 logic is described below. However, it should be appreciated that the specific evaluation criteria used to determine whether to resize and/or reconfigure a compute instance is implementation dependent.

Upon determining using the evaluation criteria 150 and the BPF interface 102 that the current resource consumption of the compute instance 110 triggers a resizing and/or reconfiguration of the compute instance 110, the scaling/configuration logic 109 may be used to determine the appropriate parameters for the resizing/reconfiguration. The particular scaling/configuration logic 109 is implementation specific, but may generally be effective to receive the events (e.g., threshold violations) and/or the resource consumption data (determined using BPF tool 182) and may deploy a new instance (or reconfigure the current compute instance 110) that is optimized for the application based on the resource consumption data. In some examples, the scaling/configuration logic 109 may be implemented as a Terraform script and/or as an Ansible role to programmatically control the deployment of the optimized compute instance (or the reconfiguration of the current compute instance).

The OS 186 and its associated hardware may run applications or programs in virtualized environments, such as virtual machines 170A-B. The BPF tool 182 may be used to monitor resource consumption at a process level. Accordingly, the BPF tool 182 may determine resource consumption for processes associated with specific applications. Additionally, the automotive OS 186 may be associated with a kernel 180. The compute instance 110 may include hardware, such as block device(s) 187 (e.g., memory), disk device(s) 189 and one or more nodes 110A-B.

Each node 110A-B may in turn include one or more physical processors (e.g., CPU 120A-B) communicatively coupled to memory devices (e.g., MD 130A-C) and input/output devices (e.g., I/O 140A-B). Each node 110A-B may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. VMs 170A-B may be provisioned on the same host or node (e.g., node 110A) or different nodes. For example, VM 170A and VM 170B may both be provisioned on node 110A. Alternatively, VM 170A may be provided on node 110A while VM 170B is provisioned on node 110B.

As used herein, physical processor, processor or CPU 120A-B, refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-C refers to a volatile or non-volatile memory device, such as RAM, ROM, EEPROM, or any other device capable of storing data. As discussed herein, I/O device 140A-B refers to a device capable of providing an interface between one or more processor pins and an external device capable of inputting and/or outputting binary data.

Processors (e.g., CPUs 120A-B) may be interconnected using a variety of techniques, ranging from a point-to-point processor interconnect, to a system area network, such as an Ethernet-based network. Local connections within each node, including the connections between a processor (e.g., CPU 120A-B) and a memory device 130A-C, may be provided by one or more local buses of suitable architecture, for example, peripheral component interconnect (PCI).

Figure 2:
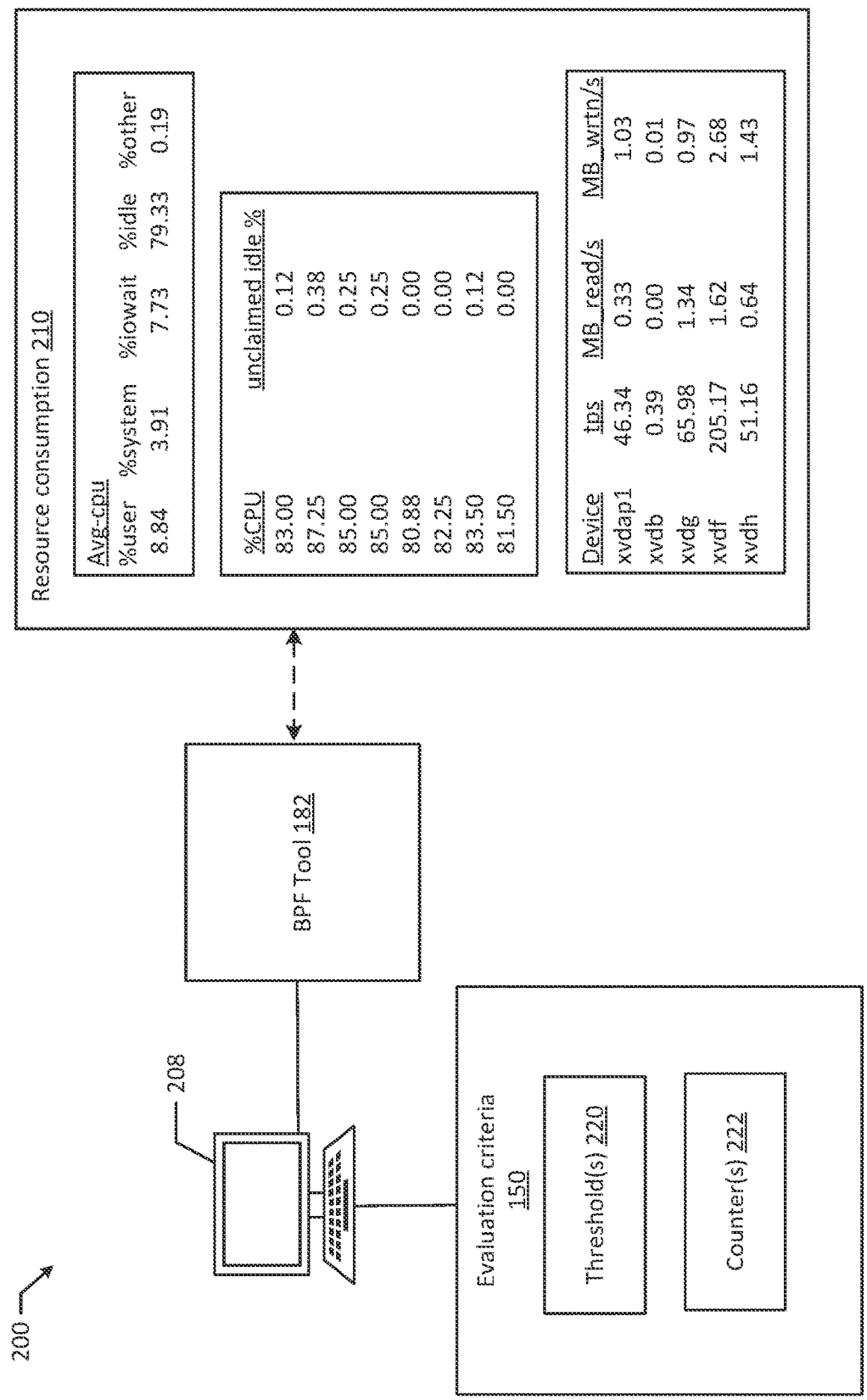
FIG. 2 illustrates a block diagram of an example of monitoring resource consumption of a compute instance using BPF technology, according to an example embodiment of the present disclosure.

FIG. 2 illustrates a block diagram of an example system 200 for monitoring resource consumption of a compute instance using BPF tool 182, according to an example embodiment of the present disclosure. As illustrated in FIG. 2, the BPF tool 182 may monitor and analyze resource consumption 210 of a deployed compute instance on which the BPF tool 182 is executed.

The resource consumption 210 may include various CPU metrics, system metrics, and other metrics associated with resource consumption of the compute instance at a process level. For example, the BPF tool 182 may monitor and analyze resource consumption 210 to determine average CPU metrics such as average CPU such as "% user", "% system", "% iowait", "% idle" and "% other". The average CPU usage by a user (e.g., % user) may indicate the average amount of CPU capacity utilized by a user (e.g., driver and specific driver activities like interacting with the entertainment system). The average CPU usage by the system (e.g., % system) may indicate the average amount of CPU capacity utilized by the automotive control system, for example, sending instructions regarding timing, ignition, etc. The average CPU usage dedicated to waiting for I/O operations (e.g., % iowait) may indicate the average amount of CPU capacity dedicated to waiting for I/O operations. One of the most relevant metrics may be the average amount of CPU that is sitting idle (e.g., % idle), which may indicate on average how much free capacity the CPU has to perform other tasks, such as software upgrades or patches. Other operating metrics may also be tracked, such as the average CPU usage dedicated to other specified activities (e.g., % other).

In addition analyzing metrics to determine average CPU metrics, resource consumption 210 may be monitored and tracked in real-time. For example, the BPF tool 182 may monitor and record instantaneous CPU usage (e.g., 83.00%) for one or more system processes and unclaimed idle percentages (e.g., 0.12%) at a predetermined sampling interval. For example, the CPU usage (e.g., 83.00%) may be the CPU usage of an application process. The unclaimed idle percentage may be an average percentage over the sampling interval. For example, if the sampling interval is 10 seconds, the unclaimed idle percentage may be the average amount over the sampling interval. In an example, the CPU usage data (e.g., percent used and percent idle) may be recorded every 2 seconds, 5 seconds, etc. The predetermined sampling interval may be anywhere from a few milliseconds to upwards of tens of seconds.

The BPF tool 182 may also monitor and record transactional data for various devices (e.g., block device(s) 187 and disk device(s) 189 of FIG. 1) associated with the operating system 186. For example, the transfers per second ("tps"), data read per second (e.g., MB_read/s) and data written per second (e.g., MB_wrtn/s) may be recorded for various devices "xvdapl", "xvdg", "xvdg", etc. which may be block device(s) 187 or disk device(s) 189. The transfer, read and write data may indicate how much the supporting hardware is being used and may indicate times of high activity or high load.

Resource consumption data generated using the BPF tool 182 may be evaluated on a desired basis using evaluation criteria 150. For example, CPU consumption percentage and/or idle percentages, memory consumption, I/O speeds, disk access speeds, etc., may be compared to respective thresholds 220. In some examples, in the event that a given threshold is violated, a counter value may be increased. When the counter value reaches a defined counter threshold. When a counter for a particular resource exceeds the counter threshold an event may be defined. Data representing the event (e.g., the threshold value, the sampled value(s), timestamp data, etc.) may be used as a programmatic input to an application programming interface that may resize and/or reconfigure the compute instance in a way that provisions the compute instance based on the sampled resource consumption from the BPF tool 182. As previously described, in some examples, an Ansible role, Terraform script, or a similar technology that supports scripting to permit cloud orchestration and which may be used to deploy an optimized compute instance and/or reconfigure the current compute instance.

The various BPF tool 182 monitoring processes may be implemented as small bits of code, such as BPF code. The code may be bytecode, and the bytecode may be WebAssembly ("WASM") bytecode or Berekely Packet Filter ("BPF") bytecode. In other examples, the code may be provided as native code such as native client ("NaCl") code. In an example, the BPF tool may include an integrated interpreter for interpreting, executing and running the small bits of code that are injected into the OS 186.

Various types of thresholds 220 may be used in accordance with the desired implementation. For example, a threshold 220 may require that at least half of the CPUs (e.g., CPU 120A and CPU 120B) to have less than 20% of their CPU capacity being unclaimed and idle. In another example, for CPU a CPU usage percentage may be 60% (or any other suitable value). Accordingly, a compute instance that uses 70% of CPU over a given sampling period may be a candidate for resizing (based on the threshold violation). For memory pressure, a memory pressure percentage (e.g., 60% of available memory) may be used. For disk metrics, a threshold may be set at a maximum of 2000 operations per second (or another suitable value). For biolatency, the latency of I/O operations may be checked to determine if the last three columns of the biolatency histogram illustrate the largest latency, etc. BPF tool 182 may monitor resources at runtime with nearly no impact on an application, allowing the BPF monitoring processes to run constantly and generate a regular stream of resource consumption data that can be used to programmatically resize cloud resources required by a monitored application.

An example implementation is provided below. However, it should be appreciated that the specific evaluation criteria 150 (including any thresholds 220 and/or counters 222—if used) are implementation dependent. Accordingly, the steps below may be modified and/or deleted in accordance with a desired implementation. Further, additional steps may be added and/or the order of steps may be modified in some implementations. The example below is merely for illustrative purposes.

1. Identify the application to be profiled.
2. Obtain the process identifier (PID) of the application on the compute instance where the BPF tool is executing.
3. Define a sampling time frame tf (e.g., 5 minutes).
4. Define thresholds for BPF tools measurements
   a. CPU usage percentage threshold (cpu_th)
   b. Memory pressure percentage threshold (mem_th)
   c. Unclaimed CPU percentage threshold (ucpu_th)
   d. Disk operation threshold (diskop_th)
   e. Biolatency average percentage threshold (biol_th). In an example, this value may be calculated by determining the percentage of I/O operations in the last three columns of the biolatency historgram. If over a threshold percentage, the boil_th is violated
   f. Syscall threshold (syscalls_th). In an example, a list of syscall may be set and a general threshold defined (e.g., 50% of all application syscall performed)
5. Use BPF tools to monitor resource consumption until expiration of tf
6. After tf expires, collect the results from the BPF tools
   a. CPU usage percentage (cpu_used)
   b. Memory pressure percentage (mem_used)
   c. Unclaimed cpu percentage (ucpu_used)
   d. Disk operations count (diskop_used)
   e. Biolatency average percentage (biol_used)
   f. Syscall percentage (syscalls_used)
7. Compare the results to the thresholds
   a. If cpu_used≥cpu_th, trigger cpu_pressure_event
   b. If mem_used≥mem_th, trigger mem_pressure_event
   c. If ucpu_used≥ucpu_th, trigger cpu_unclaimed_event
   d. If diskop_used≥diskop_th trigger disk_pressure_event
   e. If biol_used≥biol_th trigger biol_pressure_event
   f. If syscalls_used≥syscalls_th trigger syscalls_pressure_event
8. Collect events
   a. Collect all events from (7) into a data structure.
   b. Pass the data structure as an input into an automation tool (e.g., Ansible, Terraform, etc.) that reacts to events by running commands and scaling the instance (if needed)

9. Example event weights (Total weight is 100):
   a. Cpu_pressure_event weight: 25
   b. Mem_pressure_event weight: 25
   c. Disk_pressure_event weight: 20
   d. Ucpu_pressure_event weight: 10
   e. Biol_pressure_event weight: 10
   f. Syscalls_pressure_event weight: 10
10. Set up counter for each weight:
    a. Cpu_press_event_counter for cpu_pressure_event
    b. Mem_pressure_event_counter for mem_pressure_event
    c. Disk_pressure_event_counter for disk_pressure_event
    d. Ucpu_pressure_event_counter for ucpu_pressure_event
    e. Biol_pressure_event_counter for biol_pressure_event
    f. Syscalls_pressure_event_counter for syscalls_pressure_event
11. Set up counter thresholds (e.g., 5)
12. Apply a reaction strategy (examples below)
    a. Simple: if more than N thresholds are violated, proceed with resize
    b. Medium: proceed with resize if metrics belonging to a critical class (user defined) exceed relevant threshold
    c. Custom: identify the candidate size for the new compute instance and proceed if cost savings for compute instance are ≥predefined threshold
13. Reacting to events (examples)
    a. If cpu_pressure_event is triggered, increase the cpu_pressure_event_counter.
       i. If cpu_pressure_event_counter≥counter threshold, the instance should be resized to a cpu-optimized instance (perform scaling)
       ii. Reset cpu_pressure_event_counter to 0
    b. If memory_pressure_event is triggered, increase the mem_pressure_event_counter
       i. If mem_pressure_event_counter≥counter threshold, the instance should be resized to a memory-optimized one (perform scaling)
       ii. Reset mem_pressure_event_counter to 0
    c. . . .
14. Repeat from (3)

Figure 3:
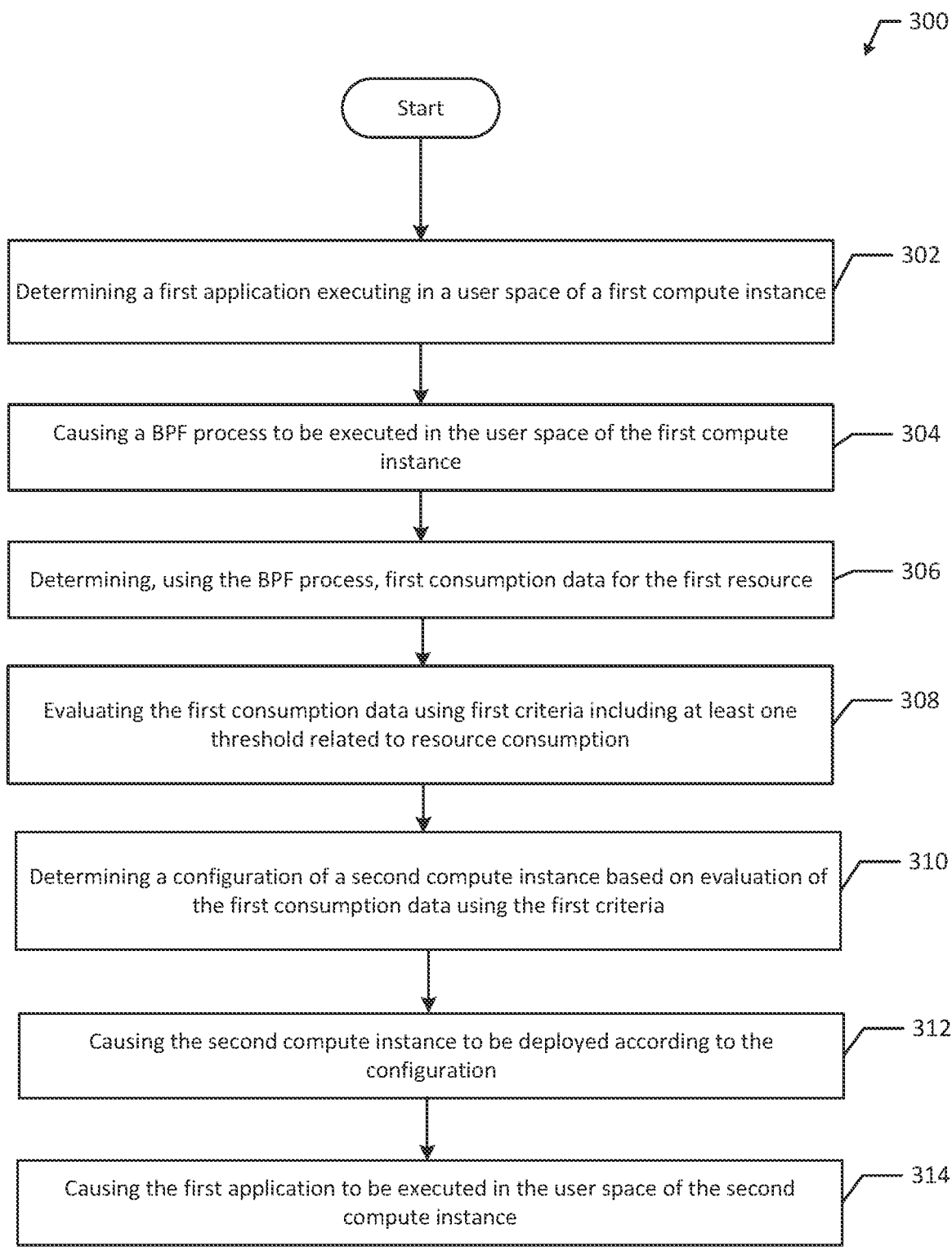
FIG. 3 illustrates a flowchart of an example process for application profiling to resize and/or reconfigure a compute instance according to an example embodiment of the present disclosure.

FIG. 3 illustrates a flowchart of an example method 300 for application profiling to resize and/or reconfigure a compute instance according to an example embodiment of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, blocks may be repeated, and some of the blocks described are optional. The method 300 may be performed by processing logic that may comprise hardware (circuitry, dedicated logic, etc.), software, or a combination of both.

In the illustrated example, method 300 includes determining a first application executing in a user space of a first compute instance (block 302). For example, a PID of an application may be determined in order to correlate processes of the application with resource consumption caused by these processes. The method 300 may include causing a BPF process to be executed in the user space of the first compute instance (block 304). As described above, the BPF tool 182 is specifically adapted to monitor resource consumption 210 of the OS 186 of the first compute instance.

Then, method 300 includes determining, using the BPF process, first consumption data for the first resource (block 306). For example, the first resource may be CPU usage, memory usage, biolatency, etc. Various BPF tools may be used to monitor the different resources at the process level (e.g., for the PID). The method 300 may include evaluating the first consumption data using first criteria including at least one threshold related to resource consumption (block 308). For example, respective thresholds for each different resource being monitored may be determined. In the example, above the cpu_used may be compared to the cpu_th threshold, the mem_used may be compared to the mem_th threshold, etc., as part of the first criteria.

The method 300 may include determining a first configuration of a second compute instance based on evaluation of the first consumption data using the first criteria (310). For example, logic may be used to rescale the various resources based on the particular amount by which the resource consumption exceeds (or falls short of) the relevant thresholds. For example, if the unclaimed CPU % exceeds the unclaimed CPU threshold by 50%, the compute instance may be resized by lowering a class of the CPU resource provided (e.g., to a less powerful class of processor resource offered by the relevant cloud service).

The method 300 may include causing the second compute instance to be deployed according to the configuration (block 312). As described above, a technology that supports scripting to permit cloud orchestration may be used to deploy a resized compute instance according to the configuration determined at block 310. The method 300 may include causing the first application to be executed in the user space of the second compute instance (block 314). The relevant application being evaluated may be deployed on the newly-instantiated compute instance that is specifically optimized for deployment of the application based on real-time resource consumption data for the application received from the BPF-based monitoring of the application on the previous compute instance.

Figure 4:
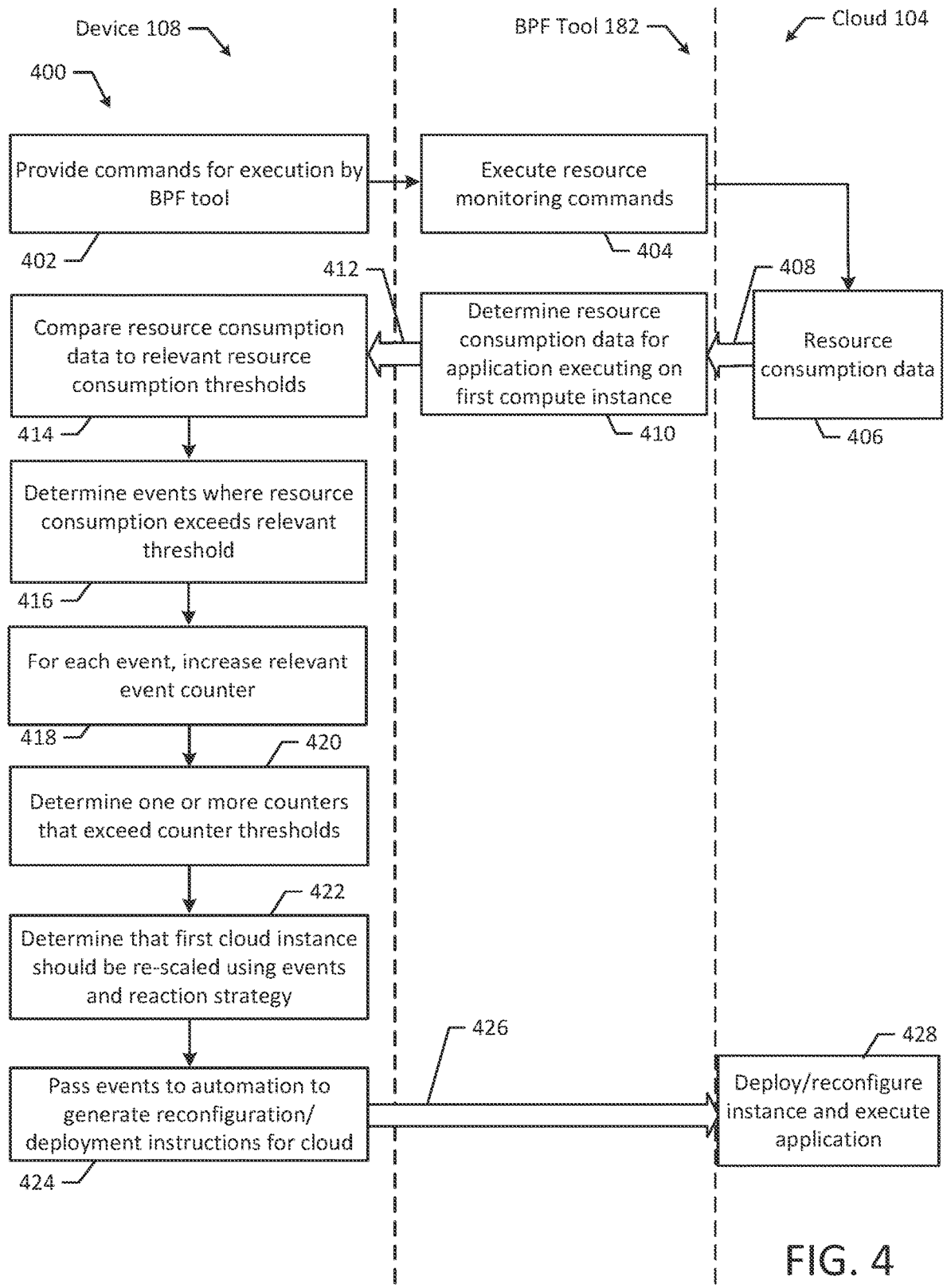
FIG. 4 illustrates a flowchart of an example process for resizing and/or reconfiguring a compute instance based on threshold events according to an example embodiment of the present disclosure.

FIG. 4 illustrates a flowchart of an example method 400 for resizing and/or reconfiguring a compute instance based on threshold events according to an example embodiment of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, blocks may be repeated, and some of the blocks described are optional. The method 400 may be performed by processing logic that may comprise hardware (circuitry, dedicated logic, etc.), software, or a combination of both.

In the illustrated example, method 400 includes device 108 providing commands for execution by BPF tool (block 402). For example, the commands may be provided via BPF interface 102. The commands may include commands to be executed by the BPF tool 182. BPF provides an in-kernel execution engine that processes a virtual instruction set, and can be extended for providing a safe way to extend kernel functionality including monitoring of compute instances processes. Front-end interfaces for BPF performance tools include BCC tools and bpftrace tools. The various BPF tools (sometimes referred to as BPF tracing tools) can provide observability for CPUs, memory (e.g., BPF memleak), disks, file systems, networking, languages, applications, containers, hypervisors, security, and the Linux kernel. In various examples, the BPF processes may provide data from a device driver of the compute instance on which the BPF tool is executing. The method 400 may include execution of the resource monitoring commands by the BPF tool 182 (block 404). BPF tool 182 may be executing in the user space of an application compute instance deployed on cloud 104. Accordingly, the compute instance in cloud 104 may determine the resource consumption data (block 406) in response to the resource monitoring commands executed by the BPF tool 182 and may provide the resource consumption data 408 determined in real time to the BPF tool 182. The BPF tool may determine the resource consumption data for an application that is executing on a first compute instance of cloud 104 (block 410). The resource consumption data 412 may be determined for a defined time period (e.g., tf) and may be provided to device 108.

Device 108 may receive the resource consumption data 412 (e.g., CPU usage data, memory usage data, I/O data, disk data, etc.) and may compare the resource consumption data to relevant resource consumption thresholds (block 414). For example, the resource consumption thresholds may be part of an evaluation criteria, such as evaluation criteria 150. The device 108 may determine "events" where the resource consumption (indicated by the resource consumption data 412) exceeds a relevant threshold (block 416). For each event determined by device 108, a counter that corresponds to that type of event may be increased (418). Resource-specific counters and/or thresholds may be part of evaluation criteria 150. The device 108 may determine one or more counters (e.g., event counters) that exceed counter thresholds (block 420). As previously described, in some examples, critical resource counters may be defined and resizing may be performed only when an event counter associated with a critical resource exceeds a counter threshold.

Device 108 may determine that the first cloud instance should be re-scaled using events and a reaction strategy (block 422). The particular reaction strategy is implementation dependent. Generally, the reaction strategy may optimize the compute instance for the real-time resource consumption data being reported by the BPF tool 182. For example, memory may be increased in a new compute instance deployment based on the fact that memory pressure exceeds a memory pressure threshold. The amount by which the memory is increased in the new compute instance deployment may be determined based on the memory consumption data determined by the BPF tool that monitors memory usage.

Device 108 may pass events to an automated tool to generate reconfiguration/deployment instructions for the cloud (block 424). For example, an Ansible role, Terraform script, or a similar technology that supports scripting to permit cloud orchestration and may be used to deploy an optimized compute instance and/or reconfigure the current compute instance on cloud 104. The instructions 426 for reconfiguring the compute instance may be provided to cloud 104. Cloud 104 may deploy/reconfigure the compute instance and execute the relevant application (block 428) according to the instructions 426.

Figure 5:
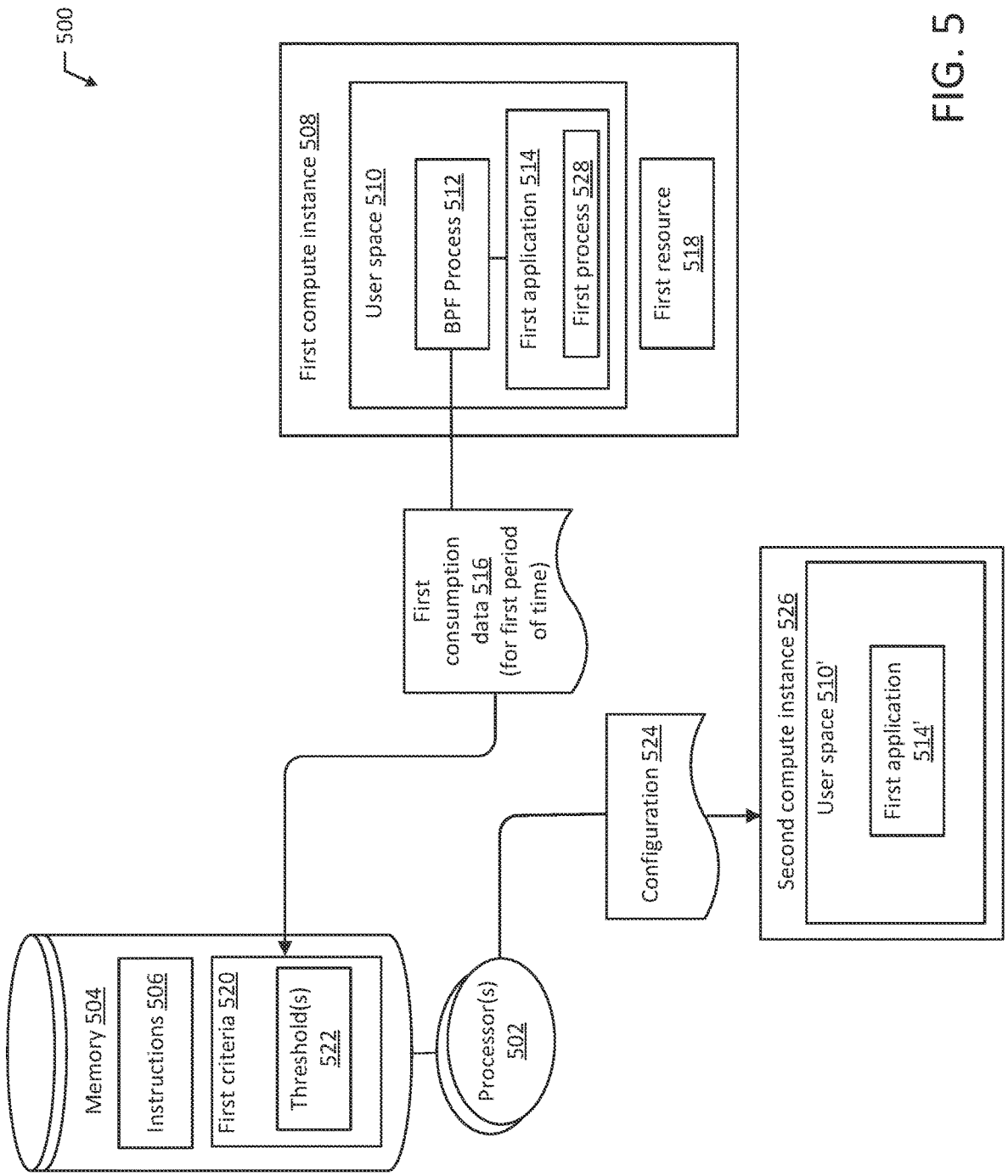
FIG. 5 depicts a block diagram showing an example system for application profiling to resize and/or reconfigure compute instances according to an example embodiment of the present disclosure.

FIG. 5 depicts a block diagram showing an example system 500 for application profiling to resize and/or reconfigure compute instances according to an example embodiment of the present disclosure. The system 500 includes memory 504 (e.g., non-transitory computer-readable memory) storing instructions 506 and first criteria 520. System 500 further includes one or more processor(s) 502 configured in communication with memory 504.

The instructions 506 may be executed by the one or more processors 502 and may be effective to determine first application 514 executing in user space 510 of first compute instance 508. In various examples, the first compute instance 508 may be deployed in a cloud computing environment (e.g., in a cluster of compute nodes managed using a cloud orchestration service). The instructions 506 may be further effective to cause BPF process 512 to be executed in the user space 510 of first compute instance 508. The BPF process 512 may monitor resource consumption of at least a first resource 518 of the first compute instance 508. The BPF process 512 may be used to determine first consumption data 516. The first consumption data 516 may be associated with at least a first process 528 of the first application and may be determined over a first period of time.

The instructions 506 may be effective to evaluate the first consumption data 516 using the first criteria 520. For example, the first criteria 520 may include one or more thresholds 522 that may be compared to values included in the first consumption data 516. The one or more thresholds 522 may be thresholds related to resource consumption of the first compute instance 508 and/or other compute instances. The instructions 506 may be further effective to determine a configuration 524 of a second compute instance 526 based on the evaluation of the first consumption data 516 using the first criteria 520. For example, the instructions 506 may be effective to determine a configuration 524 that increases (or decreases) memory capacity, networking capability, processing capacity, I/O operation capacity, disk operation capacity, etc., for the second compute instance 526 relative to the first compute instance 508.

The instructions 506 may be effective to cause the second compute instance 526 to be deployed (e.g., in a cloud-based orchestrated cluster of compute nodes) according to the configuration 524. The first application 514' may be executed in the user space 510' of the second compute instance 526. The configuration 524 of the second compute instance 526 may be optimized for the resource consumption that is associated with the first application 514.

It will be appreciated that all of the disclosed methods and procedures described herein can be implemented using one or more computer programs or components. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method comprising:
    determining a first application executing in a user space of a first compute instance;
    causing a Berkeley Packet Filter (BPF) process to be executed in the user space of the first compute instance, wherein the BPF process monitors resource consumption of a first resource of the first compute instance;

determining, using the BPF process, first consumption data for the first resource, the first consumption data being associated with a first process of the first application over a first period of time;

evaluating the first consumption data using first criteria to determine that at least one event has occurred based on the first consumption data exceeding at least one threshold, the first criteria including the at least one threshold related to resource consumption of the first compute instance;

determining a configuration of a second compute instance based on evaluation of the first consumption data using the first criteria;

subsequent to determining the configuration, causing the second compute instance to be deployed according to the configuration by generating, using an automation tool that uses event data of the at least one event as input, deployment instructions based on the configuration, the deployment instructions configured to be executed to generate a new compute instance as the second compute instance; and causing, based on the deployment instructions, the first application to be executed in the user space of the second compute instance.

2. The method of claim 1, further comprising causing a capacity of the first resource in the second compute instance to be decreased relative to the first compute instance based at least in part on evaluation of the first consumption data using the first criteria.

3. The method of claim 1, wherein the evaluating the first consumption data using the first criteria comprises:

comparing the first consumption data to a first threshold for the first resource;

determining that the first consumption data exceeds the first threshold;

increasing a counter related to the first resource; and determining that a count of the counter exceeds a counter threshold for the first resource, wherein deployment of the second compute instance is performed based at least in part on the count of the counter exceeding the counter threshold.

4. The method of claim 1, wherein the BPF process comprises at least one of:

a first BPF process monitoring central processor unit (CPU) consumption;

a second BPF process monitoring memory consumption;

a third BPF process monitoring disk usage; and a fourth BPF process monitoring input/output operations.

5. The method of claim 1, further comprising:

causing traffic to be sent to the second compute instance;

causing a second BPF process in user space of the second compute instance to be deployed, wherein the second BPF process monitors resource consumption of a first resource of the second compute instance at a process level;

determining, using the second BPF process, second consumption data for the first resource of the second compute instance; and causing deployment of the first compute instance to be terminated based at least in part on the second consumption data.

6. The method of claim 1, wherein the BPF process comprises:

causing a first BPF tracing process effective to monitor central processor unit (CPU) consumption using bcc tools to be executed; and causing a second BPF tracing process to monitor memory consumption using BPF memleak to be executed.

7. The method of claim 1, wherein the BPF process comprises determining input/output usage in terms of memory amount per unit time.

8. The method of claim 1, wherein the BPF process provides data from a device driver of the first compute instance, wherein the device driver is related to the first resource.

9. A system comprising:

at least one processor; and non-transitory computer-readable memory storing instructions that, when executed by the at least one processor, are effective to:

determine a first application executing in a user space of a first compute instance;

cause a Berkeley Packet Filter (BPF) process to be executed in the user space of the first compute instance, wherein the BPF process monitors resource consumption of a first resource of the first compute instance;

determine, using the BPF process, first consumption data for the first resource, the first consumption data being associated with a first process of the first application over a first period of time;

evaluate the first consumption data using a first criteria to determine that at least one event has occurred based on the first consumption data exceeding at least one threshold, the first criteria including the at least one threshold related to resource consumption of the first compute instance;

determine a configuration of a second compute instance based on evaluation of the first consumption data using the first criteria;

subsequent to determining the configuration, cause the second compute instance to be deployed according to the configuration by generating, using an automation tool that uses event data of the at least one event as input, deployment instructions based on the configuration, the deployment instructions configured to be executed to generate a new compute instance as the second compute instance; and cause, based on the deployment instructions, the first application to be executed in the user space of the second compute instance.

10. The system of claim 9, the non-transitory computer-readable memory storing further instructions that, when executed by the at least one processor, are further effective to cause a capacity of the first resource in the second compute instance to be decreased relative to the first compute instance based at least in part on evaluation of the first consumption data using the first criteria.

11. The system of claim 9, the non-transitory computer-readable memory storing further instructions that, when executed by the at least one processor, are further effective to:

compare the first consumption data to a first threshold for the first resource;

determine that the first consumption data exceeds the first threshold;

increase a counter related to the first resource; and determine that a count of the counter exceeds a counter threshold for the first resource, wherein deployment of the second compute instance is performed based at least in part on the count of the counter exceeding the counter threshold.

12. The system of claim 9, wherein the BPF process comprises at least one of:
a first BPF process configured to monitor central processor unit (CPU) consumption;
a second BPF process configured to monitor memory consumption;
a third BPF process configured to monitor disk usage; and
a fourth BPF process configured to monitor input/output operations.

13. The system of claim 9, the non-transitory computer-readable memory storing further instructions that, when executed by the at least one processor, are further effective to:
cause traffic to be sent to the second compute instance;
cause a second BPF process in user space of the second compute instance to be deployed, wherein the second BPF process monitors resource consumption of a first resource of the second compute instance at a process level;
determine, using the second BPF process, second consumption data for the first resource of the second compute instance; and
cause deployment of the first compute instance to be terminated based at least in part on the second consumption data.

14. The system of claim 9, the non-transitory computer-readable memory storing further instructions that, when executed by the at least one processor, are further effective to:
cause a first BPF tracing process effective to monitor central processor unit (CPU) consumption using bcc tools to be executed; and
cause a second BPF tracing process to monitor memory consumption using BPF memleak to be executed.

15. The system of claim 9, wherein the BPF process comprises determining input/output usage in terms of memory amount per unit time.

16. The system of claim 9, wherein the BPF process provides data from a device driver of the first compute instance, wherein the device driver is related to the first resource.

17. A non-transitory machine readable medium storing a program, which when executed by at least one processor causes a container-based cluster of compute nodes to:
determine a first application executing in a user space of a first compute instance of the container-based cluster of compute nodes;
cause a Berkeley Packet Filter (BPF) process to be executed in the user space of the first compute instance, wherein the BPF process monitors resource consumption of a first resource of the first compute instance;
determine, using the BPF process, first consumption data for the first resource, the first consumption data being associated with a first process of the first application over a first period of time;
evaluate the first consumption data using a first criteria_to determine that at least one event has occurred based on the first consumption data exceeding at least one threshold, the first criteria including the at least one threshold related to resource consumption of the first compute instance;
determine a configuration of a second compute instance based on evaluation of the first consumption data using the first criteria;
subsequent to determining the configuration, cause the second compute instance to be deployed according to the configuration by generating, using an automation tool that uses event data of the at least one event as input, deployment instructions based on the configuration, the deployment instructions configured to be executed to generate a new compute instance as the second compute instance; and
cause, based on the deployment instructions, the first application to be executed in the user space of the second compute instance.

18. The non-transitory machine readable medium of claim 17, which, when executed by the at least one processor, further causes the container-based cluster of compute nodes to:
decrease a capacity of the first resource in the second compute instance relative to the first compute instance based at least in part on evaluation of the first consumption data using the first criteria.

19. The non-transitory machine readable medium of claim 17, which, when executed by the at least one processor, further causes the container-based cluster of compute nodes to:
compare the first consumption data to a first threshold for the first resource;
determine that the first consumption data exceeds the first threshold;
increase a counter related to the first resource; and
determine that a count of the counter exceeds a counter threshold for the first resource, wherein deployment of the second compute instance is performed based at least in part on the count of the counter exceeding the counter threshold.

20. The non-transitory machine readable medium of claim 17, wherein the BPF process comprises at least one of:
a first BPF process configured to monitor central processor unit (CPU) consumption;
a second BPF process configured to monitor memory consumption;
a third BPF process configured to monitor disk usage; and
a fourth BPF process monitoring configured to monitor input/output operations.

\* \* \* \* \*